(12) United States Patent
Feil

(10) Patent No.: US 10,349,373 B2
(45) Date of Patent: Jul. 9, 2019

(54) SYSTEM AND METHOD FOR DETERMINING THE POSITION OF A MOBILE WARNING POST

(71) Applicant: OSRAM GmbH, Munich (DE)

(72) Inventor: Henry Feil, Unterhaching (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/775,430

(22) PCT Filed: Oct. 19, 2016

(86) PCT No.: PCT/EP2016/075052
§ 371 (c)(1),
(2) Date: May 11, 2018

(87) PCT Pub. No.: WO2017/080765
PCT Pub. Date: May 18, 2017

(65) Prior Publication Data
US 2018/0324739 A1 Nov. 8, 2018

(30) Foreign Application Priority Data
Nov. 13, 2015 (DE) .................. 10 2015 222 471

(51) Int. Cl.
*H04W 24/00* (2009.01)
*H04W 64/00* (2009.01)
*H05B 37/02* (2006.01)

(52) U.S. Cl.
CPC ........ *H04W 64/00* (2013.01); *H05B 37/0272* (2013.01)

(58) Field of Classification Search
CPC ............................ H04W 64/00; H05B 37/0272
(Continued)

(56) References Cited

U.S. PATENT DOCUMENTS

2011/0140864 A1* 6/2011 Bucci ................. G08C 17/02
340/10.42

FOREIGN PATENT DOCUMENTS

DE 60304856 T2 11/2006
DE 202009005690 U1 9/2010
(Continued)

OTHER PUBLICATIONS

International Search Report based on application No. PCT/EP2016/075052 (3 pages and 2 pages of English (translation) dated Dec. 7, 2016 (Reference Purpose Only).
(Continued)

*Primary Examiner* — Huy C Ho
(74) *Attorney, Agent, or Firm* — Viering Jentschura & Partner MBB

(57) ABSTRACT

A system for ascertaining the position of a mobile beacon comprising at least one first and at least one second lighting device, each comprising a communication module for setting up a data network between the at least one first and at least one second lighting device by means of a wireless communication link, the mobile beacon, which is configured to emit an identification signal with a beacon identification number unique within the system, wherein the respective communication modules of the at least one first and at least one second lighting device are configured to ascertain a respective signal strength at which the identification signal is receivable by the respective communication module. The mobile beacon has a timer and is configured to transmit, in addition to the beacon identification number, a counter reading of the timer corresponding to a time of emission of the first identification signal.

12 Claims, 2 Drawing Sheets

(58) Field of Classification Search
USPC .................................................. 455/456.1
See application file for complete search history.

(56) References Cited

FOREIGN PATENT DOCUMENTS

| WO | 03094564 A1 | 11/2003 |
| WO | 2015025235 A1 | 2/2015 |
| WO | 2015118135 A1 | 8/2015 |
| WO | 2015162295 A1 | 10/2015 |

OTHER PUBLICATIONS

German Search Report based on application No. 10 2015 222 471.6 (8 pages) dated Jun. 23, 2016 (Reference Purpose Only).

* cited by examiner

SYSTEM AND METHOD FOR DETERMINING THE POSITION OF A MOBILE WARNING POST

CROSS-REFERENCE TO RELATED APPLICATION

The present application is a national stage entry according to 35 U.S.C. § 371 of PCT application No.: PCT/EP2016/075052 filed on Oct. 19, 2016, which claims priority from German Patent Application Serial No.: 10 2015 222 471.6 which was filed on Nov. 13, 2015, and is incorporated herein by reference in its entirety and for all purposes.

TECHNICAL FIELD

The description relates to a system for ascertaining the position of a mobile beacon. In addition, the description relates to a method for ascertaining the position of a mobile beacon.

BACKGROUND

Lighting components such as luminaires are intrinsically very homogeneously distributed in what is known as a luminaire louvre within buildings, have permanent access to the power supply and have a housing that is predestinated to hold additional modules and functionalities.

Modern luminaires use LED-based illuminants that are operated by an electronic operating unit (driver). The driver is customarily used to actuate an LED module within the luminaire. Secondly, the driver is connected to an overall light management system. The driver may moreover have an additional power supply connection for additional communication modules and a communication interface for communication with said power supply connection.

Such a communication module may be a fixed transmitter (beacon) that is received by a mobile terminal and provides local services, such as self-location, for example. In addition, it is also possible for mobile beacons to be used in order to locate these via the communication modules. Thus, it is possible for the location of items within a building to be ascertained, for example. In this context, DE 20 2009 005 690 U1 discloses a locating system for items of equipment in a building, wherein this item of equipment includes at least one location signal transmitter, the location signal transmitter being capable of delivering at least one location signal, and/or includes at least one location signal receiver, the location signal receiver being capable of receiving at least one of these location signals, wherein the location signal transmitter and the location signal receiver interact such that this interaction makes it possible to identify the physical position of the item of equipment in the building.

Moreover, the communication modules may allow the setup of a network by means of reciprocal communication with the respective adjacent communication modules, in order to receive data and forward them to a gateway. Such a gateway may be connected to a server, for example, that collects the data. An identification signal emitted by a mobile beacon may be received by multiple communication modules. As a result, it is possible to attain a higher level of security for the mobile beacon itself and hence also for the item that is equipped with the mobile beacon.

Every beacon is received at an associated signal strength. This information helps to increase the accuracy of location, either by means of trilateration (level measurement, no propagation time measurement) or when using what is known as a fingerprint map representing a map in which previously measured signal strengths are entered which are assigned to the associated location. The communication modules receive the identification signals, which include an explicit identification number, what is known as the UUID (universally unique identifier), and forward them together with the individually received signal strength, serving as location information, to a server via a mesh network. From this, the server may ascertain the history of the whereabouts of the mobile beacons incorporated in the system.

A perturbing effect for this application is that a mesh network has the property of using different paths to send the information to the server. This means. that the received location information may be received in an order that does not necessarily correspond to the order of pickup of the location information. This may cause inaccuracies in the evaluation calculations.

SUMMARY

It is, therefore, a non-limiting object of the present description to provide a system and a method that improve locating accuracy for identification signals transported via a mesh network for the purpose of location determination.

The description is based on a system for ascertaining the position of a mobile beacon, which is developed by at least one first and at least one second lighting device, each including a communication module for setting up a data network between the at least one first and at least one second lighting device by means of a wireless communication link, and the mobile beacon, which is designed to emit an identification signal with a beacon identification number that is unique within the system. In this case, the respective communication modules of the at least one first and at least one second lighting device are designed to ascertain a respective signal strength at which the identification signal is receivable by the respective communication module, wherein the mobile beacon has a timer and is designed to transmit, in addition to the beacon identification number, a counter reading of the timer corresponding to a time of emission of the first identification signal.

The description is based on the insight that the perturbing influence of delays that possibly arise on account of different routing paths of the transmitted location information within the data network may be avoided by virtue of a time stamp being used to document what beacon location information has been picked up when.

Accordingly, a separate timer may be provided for each communication module, all the timers needing to be synchronized. Synchronization of the communication modules is complex in this case because internal timers usually have a drift over time and accordingly a trigger signal is required at least for the start of the internal timers and in order to resynchronize them from time to time.

The description is based on the further insight that a technically simpler solution is obtained if, instead, a timer in the mobile beacon itself is used that generates a time stamp, this time stamp being added to the location information. At the server end, all the location information for each mobile beacon may be sorted according to time, which means that more reliable object tracking becomes realizable. In particular, this results in the advantage that the timer of the mobile beacon does not require any kind of synchronization, which means that a local timer is sufficient.

According to an advantageous non-limiting embodiment, the respective communication module has a module identification number that is unique within the system, wherein the respective communication module is designed so as, on reception of the identification signal, to use the data network to send a data record including its own module identification number, the beacon identification number transmitted with the first identification signal, the respectively ascertained signal strength and the counter reading transmitted with the identification signal. The compilation of a data record of this kind therefore allows the ascertainment of the temporal relationship between all the data records transmitted in the data network that are associated with the mobile beacon, wherein both the respective reception location in the form of the respective module identification number and the associated signal strength by which the identification signal has been received at this location are transmitted as well. Based on these data, it is therefore possible for the path of the mobile beacon to be tracked more accurately.

Preferably, a time base of 100 milliseconds may be provided for the timer. If the time base is short enough, it is therefore possible for moving objects equipped with the mobile beacon to be tracked. The timer should have a counter range that is greater than the maximum routing time in the data network, in particular a mesh network, so as not to receive the location information twice at the same time stamp. If the maximum routing time in the mesh network thus requires five seconds, it is proposed that the maximum counter value be at least 128 (7 bits), which is sufficient for 12.8 seconds when the time base chosen is 100 milliseconds.

According to an advantageous non-limiting embodiment, the system has a server unit that stores the installation positions of the at least one first and at least one second lighting device as a function of the respective module identification number and that is designed to take the data records that are each transmittable from the data network to the server unit and include the beacon identification number of the mobile beacon as a basis for ascertaining the position of the mobile beacon. As a result, it is possible for the whereabouts of the respective items equipped with a mobile beacon to be picked up and monitored centrally.

According to an advantageous non-limiting embodiment, the server unit is designed to ascertain the position of the mobile beacon by taking into consideration only data records whose transmitted counter reading is within a respectively prescribable range of values. Therefore, the respective current position may be ascertained by using the data records that are within a time interval that may be prescribed arbitrarily in multiples of the time base used for the timer, for example 100 milliseconds, 200 milliseconds or 500 milliseconds. This ensures that all of these data records have been received by the respective communication modules within the same time interval. This fixed temporal reference applies in particular to a radio signal that is usually emitted by a beacon, which, in particular in respect of the area of application within buildings having comparatively short distances, exhibits practically no propagation time difference.

In addition, there may be provision for, after the location information, including the counter reading (time stamp), has been sorted according to the beacon identification number, a further time stamp generated by the server to be added in order to change from a relative to an absolute time scale, which is necessary for the further analyses. This applies in particular if the path of an object to be tracked is supposed to be recorded over a relatively long period, since the counter reading provided by the mobile beacon may already have overflowed in this case on account of its design as a short-term timer, which means that ambiguities may arise.

Alternatively, client-end position ascertainment may be performed by a mobile terminal, as a non-limiting example, using a smartphone. The mobile terminal may be designed to allow access to the data network and to retrieve the data records relevant to the ascertainment of the position of the mobile beacon from the data network.

Advantageously, the installation positions of the at least one first or the at least one second lighting device are already stored on the mobile terminal, so that location of the mobile beacon is made possible even without an online connection. It goes without saying that this also allows self-location of the mobile terminal to take place by virtue of the mobile terminal imitating a mobile beacon.

According to a further non-limiting embodiment, the data network is configured as a Bluetooth mesh network. This allows the transmission power to be kept low, since the data transmission may be effected between adjacent lighting devices. In this way, no great distances need to be spanned as in the case of the use of a central network node. Bluetooth is particularly suitable for such radio networks in a surrounding area of approximately 10 meters, in particular the Bluetooth variant "Bluetooth Low Energy" (BLE), also called Bluetooth Smart.

According to a further advantageous non-limiting embodiment, the system includes a gateway that is designed to set up a data link to the data network. In particular, the gateway allows the connection to the server unit. This means that the data network may be incorporated into a superordinate network, for example into an LAN network or into a WLAN network. The gateway may moreover be designed to provide the connection to a mobile terminal.

According to a further advantageous non-limiting embodiment, at least the first lighting device includes an illuminant an electronic operating unit for operating the illuminant, wherein the communication module of the first lighting device is connected to the electronic operating unit via a data interface, wherein the communication module is designed to read operating values from the electronic operating unit and/or to write them to the electronic operating unit.

As a result, it is advantageously possible for the data network to be used to configure the first lighting device, that is to say to adapt particular prescribed parameters, which a manufacturer of the lighting device or of the electronic operating unit allows to be changed via the customer, within the prescribed limits for the respective parameter. Similarly, there may be provision for operating values to be read from the electronic operating unit, for example a currently set power or the value of an operating hours meter.

Alternatively or additionally, there may be provision for at least an operating software of the electronic operating unit, what is known as the firmware, to be updated, in particular for a complete software update to be installed, which results in the option of what is known as a firmware over the air (FOTA).

According to an advantageous non-limiting embodiment, the electronic operating unit may be designed to provide a power supply for the communication module of the first lighting device. This allows a separate switched-mode power supply unit for supplying power to the communication module to be dispensed with, for example.

According to an advantageous non-limiting embodiment, the mobile beacon is designed to detect a proper motion and to take a detected proper motion as the basis of emitting the identification signal. In particular, there may be provision for an identification signal to be sent exclusively when a proper motion of the mobile beacon has been detected. For this, it is possible, by way of a non-limiting example, for an acceleration sensor, a gyro sensor, a magnetic field sensor or a light sensor with threshold value triggering to be employed.

Similarly, there may be provision for an identification signal to be emitted within a prescribable period of time in any case even without detected proper motion. This may take place once per day, for example. This ensures that a mobile beacon is picked up with the latest status at least on a daily basis and missing measured values are not interpreted as an absent location change if, by way of example, the mobile beacon has failed, for example, as a result of a dead battery in the mobile beacon.

The emission of the signal in just the cases in which the mobile beacon is moved allows the power consumption to be minimized. This allows particularly long battery lives to be realized. Furthermore, Bluetooth Low Energy technology already allows low power consumption, since operation of the devices is already optimized for low power consumption.

Optionally, there may be provision for the mobile beacon to emit a signal if the battery state of charge is low. Such a signal may be sent via the data network, for example. Alternatively or additionally, visual and/or audible signaling is possible.

The description furthermore includes a method for ascertaining the position of a mobile beacon, which is developed according to the invention by setup of a data network between at least one first and at least one second lighting device by means of a wireless communication link, emission of an identification signal with a beacon identification number that is unique within a system by the mobile beacon, ascertainment of a respective signal strength at which the first identification signal is received by a respective communication module of the at least one first and at least one second lighting device, and in addition to the beacon identification number, transmission of a counter reading of a timer of the mobile beacon with the first identification signal corresponding to a time of emission of the first identification signal for transmission.

The addition of the counter reading to the beacon identification number for the emission of the identification signal to the at least one first and at least one second lighting device therefore allows the respective data required for position ascertainment to be combined independently of the respective reception location, without synchronization of the reception devices, that is to say the communication modules, among one another being required.

The advantages and features and also embodiments described for the system according to the invention apply in equal measure to corresponding methods, and vice versa. Consequently, corresponding method features may be provided for apparatus features, and vice versa.

The above features and combinations of features cited in the description and the below features and combinations of features cited in the description of the figures and/or shown in the figures alone may be used not only in the respectively indicated combination but also in other combinations or on their own, without departing from the scope of the description. Therefore, embodiments that are not explicitly shown or explained in the figures, but emanate and are producible from the explained embodiments by virtue of self-contained combinations of features, are also intended to be regarded as included and disclosed by the description.

Further advantages and features will emerge on the basis of the present description of an exemplary embodiment and in the light of the accompanying figures. In the figures, like reference signs denote like features and functions.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
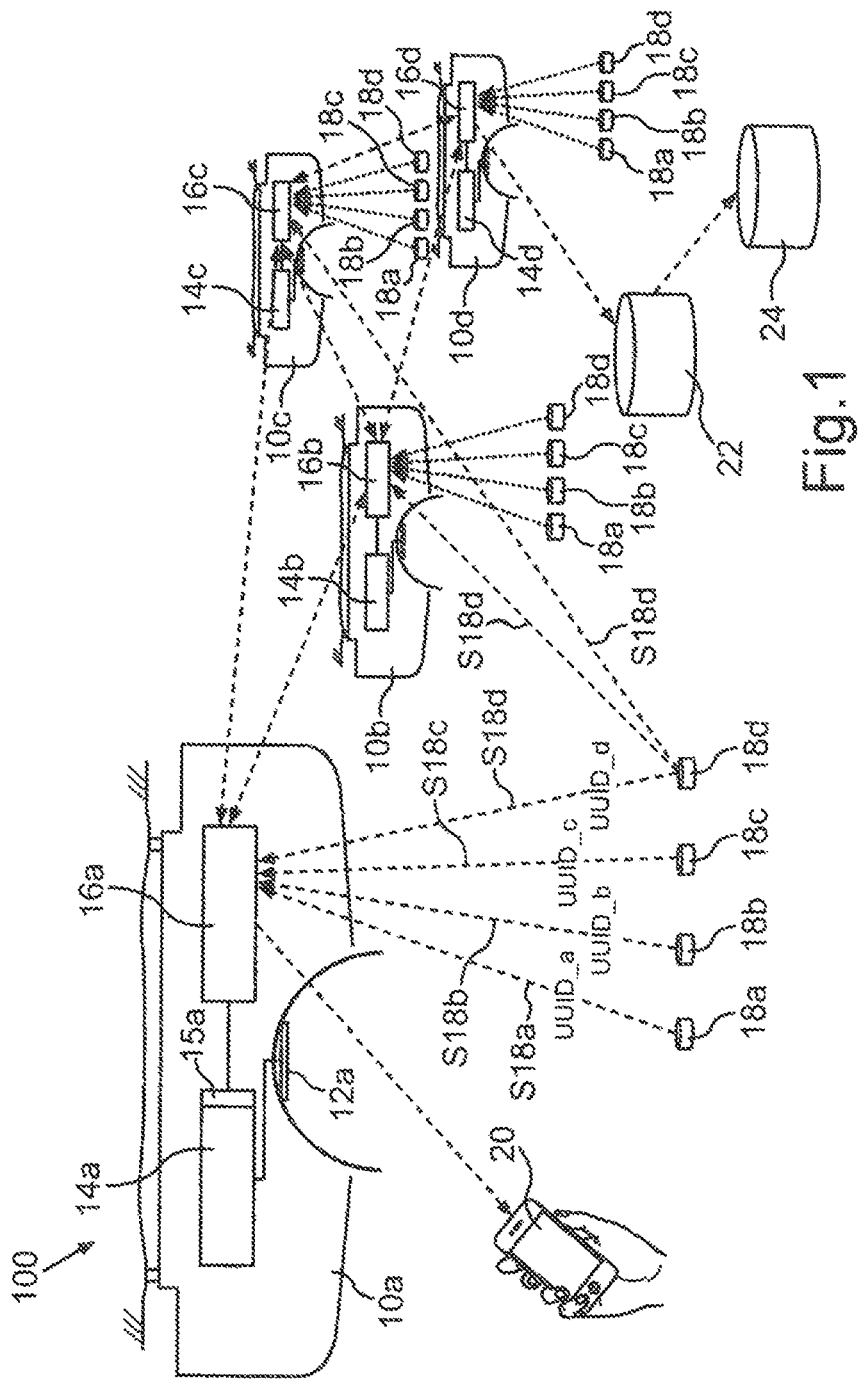
FIG. 1 shows a simplified schematic depiction of a preferred exemplary embodiment of a system according to the invention.

According to a non-limiting embodiment, a system 100 according to the description, according to the depiction in FIG. 1, has a first luminaire 10a, a second luminaire 10b, a third luminaire 10c and a fourth luminaire 10d. The four luminaires 10a, 10b, 10c, 10d are each of identical design, which means that the detailed design is explained below only using the example of the first luminaire 10a, the same applying to the other luminaires 10b, 10c, 10d accordingly with adjusted indices. The first luminaire 10a includes an LED module 12a. The LED module 12a is operated by an LED driver 14a, which has a serial data interface 15a that allows a bidirectional data link to a communication module in the form of a Bluetooth module 16a.

A task of the luminaire 10a is optimized light distribution to an area that the luminaire 10a is intended to illuminate. For interior applications, various types of luminaires are available, primarily linear lights, spotlights or recessed luminaires, which are often integrated into the ceiling as downlights. A luminaire 10a consists of a mechanical interface, an electrical interface and a thermal interface, a housing, optical lenses and/or reflectors for directing light, distributing light and suppressing glare. The luminaire 10a therefore includes the LED module 12a, the LED driver 14a and the Bluetooth module 16a in the system 100.

The LED driver 14a may advantageously be used to supply the Bluetooth module 16a with electricity. The LED driver 14a includes a serial UART communication interface 15a, which is used to send control information to the Bluetooth module 16a in order to switch it to different modes of operation, to obtain control information from the Bluetooth module 16a and finally to obtain data from a mobile terminal 20 that are forwarded by the Bluetooth module 16a so as thereby to set parameters in the LED driver 14a and/or to install software updates.

As mentioned previously, the Bluetooth module 16a is advantageously supplied with electric power by the LED driver 14a. The bidirectional UART communication interface 15a between the Bluetooth module 16a and the LED driver 14a may be used to send control information to the Bluetooth module 16a which control information switches the latter to different modes of operation. Such modes may be, by way of non-limiting example:

Sleep mode: The Bluetooth module 16a merely reacts to commands from the UART communication interface, that is to say the Bluetooth functionality is switched off in this state.

Beacon mode: The Bluetooth module 16a operates in beacon mode.

Configuration mode: in this case, the beacon-specific parameters are set, such as time interval, signal strength (RSSI)

Data transmission mode I (High Data Mode): The Bluetooth module 16a is used to provide a data transmission between the mobile terminal 20 and the Bluetooth module 16a. This mode is used to read parameters of the LED driver 14a, to send them and to load new parameters and software updates into the LED driver 14a.

Data transmission mode II (Low Data Mode): The Bluetooth module 16a receives the UIID and the signal strength (RSSI) from four beacons 18a, 18b, 18c, 18d. This information is forwarded by means of the mesh network to the other Bluetooth modules 16b, 16c, 16d and finally to a Bluetooth router 22, which serves as a gateway. In order to insert the identification number UIID and the signal strength RSSI in a single data sequence/bit bundle of 8 bytes, the data may be compressed. By way of example, two bytes may be provided for the signal strength RSSI and 6 bytes may be provided for the identification number UUID. A beacon may be picked up by multiple Bluetooth modules 16a, 16b, 16c, 16d in order to improve system accuracy.

Control mode: A control mode may be provided by virtue of the Bluetooth module 16a being used to provide commands for controlling the LED driver 15a. This may be accomplished, by way of example, by means of an operating point for setting a light value for the luminaire 10a, in particular also by means of a mobile terminal 20; similarly, there may be provision for the Bluetooth module 16a to be coupled to an external sensor via a Bluetooth link so as thereby to control the LED driver 14a on the basis of a sensor value. In the control mode, it is therefore possible for control information to be sent from the Bluetooth module 16a to the LED driver 14a.

FIG. 1 depicts this using the example of a first beacon 18a, a second beacon 18b, a third beacon 18c and a fourth beacon 18d. For the sake of clarity, connections to different Bluetooth modules 16a, 16b, 16c, 16d are shown only from the fourth beacon 18d. Alternatively, the four beacons 18a to 18d are instead depicted again in duplicated fashion for each of the luminaires 10b, 10c, 10d.

Moreover, measures may be provided to ensure protected access to the Bluetooth modules 16a, 16b, 16c, 16d and the LED drivers 14a, 14b, 14c and 14d.

The four beacons 18a, 18b, 18c, 18d are passive Bluetooth devices that are optimized in terms of their power consumption, the four beacons 18a, 18b, 18c, 18d each emitting a signal S18a, S18b, S18c, S18d only when they are moved. Thus, the power consumption may be minimized. It is therefore assumed in the system 100 that the previous position is maintained if there is no motion.

The beacons 18a, 18b, 18c, 18d may be mounted, by way of example, on—in particular high-end—portable or mobile devices, for example medical devices in hospitals. In this way, it is a simple matter to pick up where the relevant device is currently located.

There may be provision in this case for the respective beacon 18a, 18b, 18c, 18d to emit a signal if the battery state of charge is low, this preventing one of the beacons 18a, 18b, 18c, 18d from stopping transmission operation unnoticed, and the associated item on which the beacon is mounted not incorrectly being assumed to continue to be at the last known position.

The Bluetooth router 22, which operates as a gateway, may send data to an external server 24 and/or may receive data therefrom. The Bluetooth router 22 is therefore an access point for the Bluetooth mesh network. The Bluetooth router 22 is therefore used to forward data (information) and commands to the Bluetooth mesh network.

The server 24 is used for data management. It may centrally store all the identification data, that is to say the beacon identification numbers UUID_a, UUID_b, UUID_c, UUID_d and the module identification numbers of the individual Bluetooth modules 16a, 16b, 16c, 16d, including the respective position information pertaining to the installation position of the respective luminaire 10a, 10b, 10c, 10d or of the integrated Bluetooth module 16a, 16b, 16c, 16d. The server 24 may ascertain and continually update the current positions of the respective beacons within the system 100, that is to say of the first beacon 18a, the second beacon 18b, the third beacon 18c and the fourth beacon 18d, on the basis of the data that are provided to it by the Bluetooth gateway 22 from the Bluetooth mesh network.

In particular, there may be provision for a motion history of the respective beacons to be recorded. In this way, it is also possible to obtain statistical evaluations of which devices are used most frequently and longest in which area, for example.

Figure 2:
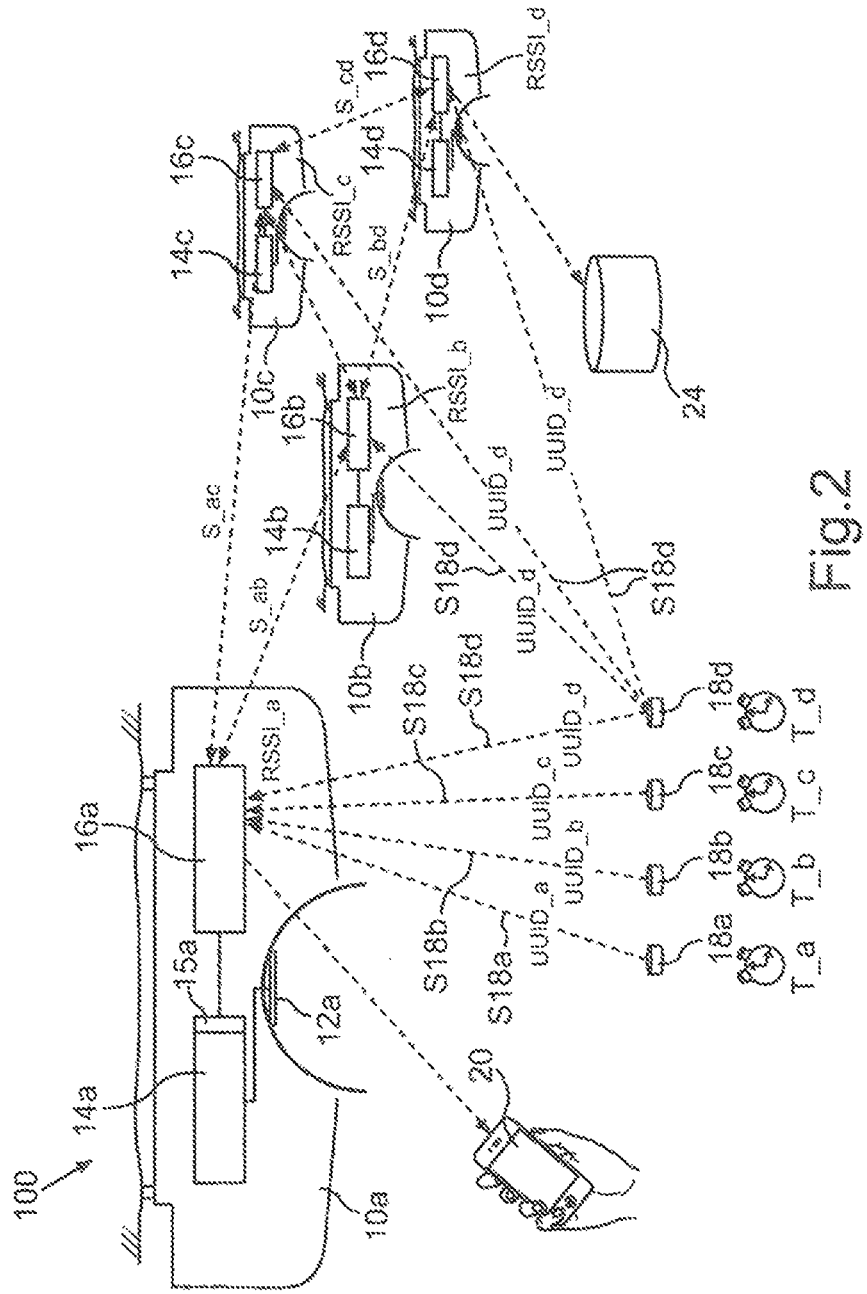
FIG. 2 shows a schematic depiction of an exemplary data transmission in the system according to the depiction from FIG. 1.

FIG. 2 shows the data traffic on the Bluetooth network by way of example. As depicted previously, the first beacon 18a sends a first identification signal S18a containing a beacon identification number UUID_a that is unique within the system 100. In addition to the beacon identification number UUID_a, a counter reading T_a is moreover transmitted. In the same way, a second identification signal S18b having a second beacon identification number UUID_b and the second counter reading T_b, a third identification signal S18c having a third beacon identification number UUID_c and a third counter reading T_c and a fourth identification signal S18d having a fourth beacon identification number UUID_d and a fourth counter reading T_d are sent. By way of example, the fourth counter reading T_d has the value 11100 at a first time T1, and the value 11101 at a second time T2, which follows the first state later. For the fourth beacon 18d, the transmission is depicted for each of all four Bluetooth modules 16a, 16b, 16c, 16d.

The fourth beacon 18d sends the fourth identification signal S18d to the first Bluetooth module 16a. This receives the signal S18d at a signal strength of RSSI_a=3. The identification signal S18d was transmitted at a time at which the value of the fourth counter reading T_d assumed the value 11100. These data are now transmitted as a common data packet to the third Bluetooth module 18c via a data link S_ac, namely "BTMod_a: UUID_d, RSSI_a=3, T_d=11100".

This data packet is forwarded from the third Bluetooth module 16c to the fourth Bluetooth module 16d with the same packet content "BTMod_a: UUID_d, RSSI_a=3, T_d=11100" via a further data link S_cd. In the same way, the first Bluetooth module 16a forwards the already depicted data packet to the second Bluetooth module 16b via a data link S_ab.

The second Bluetooth module 16b has actually also received the fourth identification signal S18d on a direct path, but at a lower signal strength. The associated data record that the second Bluetooth module 16b ascertains therefrom is "BTMod_b: UUID_d, RSSI_b=2, T_d=11100".

The identity of the two counter readings that have been ascertained from the respectively received fourth identification signal S18d therefore reveals that the two data packets have been ascertained at least within a prescribed time interval, that is to say are correlated with one another in time.

The data packet generated by the second Bluetooth module 16b is forwarded to the sever 24 by the fourth Bluetooth module 16d in the same way as the data packet generated by the first Bluetooth module 16a and forwarded via the third Bluetooth module 16c. The gateway 22 has been omitted from FIG. 2 for the sake of clarity.

Therefore, the following table of data records may now be obtained for the server 24 by way of example:

BTMod_a: UUID_d, RSSI_a=3, T_d=11100
BTMod_b: UUID_d, RSSI_b=2, T_d=11100
BTMod_c: UUID_d, RSSI_c=5, T_d=11101
BTMod_d: UUID_d, RSSI_d=3, T_d=11100
BTMod_a: UUID_d, RSSI_a=3, T_d=11101
BTMod_b: UUID_d, RSSI_b=2, T_d=11101
BTMod_c: UUID_d, RSSI_c=5, T_d=11100
BTMod_d: UUID_d, RSSI_d=3, T_d=11101

Therefore, the case may also arise in which a pickup of the fourth beacon 18d, which occurred first, is transmitted to the server 24 via the third Bluetooth module 16c only after a later pickup between the same Bluetooth transmitter or receiver pairs involved.

Similarly, the situation depicted in FIG. 2 may result in the transmission of the data packet "BTMod_b: UUID_d, RSSI_b=2, T_d=11100" to the fourth Bluetooth module 16d also being followed by the first data packet depicted being forwarded to the fourth Bluetooth module 16d via the data link S_ab by means of the second Bluetooth module 16b and subsequently forwarded to the server 14, which detects therefrom that it has already obtained exactly the same data packet with an identical time stamp on another path.

The embodiment is used merely to explain the invention and is not limiting therefor. In particular, the specific configurations of the data format may be arranged as desired, without departing from the concept of the invention.

It has therefore been shown above how compensation for the operating delay may be realized for improved beacon position determination in buildings.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A system for ascertaining the position of a mobile beacon comprising:
   at least one first and at least one second lighting device, each comprising a communication module for setting up a data network between the at least one first and at least one second lighting device by means of a wireless communication link,
   the mobile beacon configured to emit an identification signal with a beacon identification number unique within the system, wherein
   the respective communication modules of the at least one first and at least one second lighting device are configured to ascertain a respective signal strength at which the identification signal is receivable by the respective communication module, wherein
   the mobile beacon has a timer and is configured to transmit, in addition to the beacon identification number, a counter reading of the timer corresponding to a time of emission of the first identification signal.

2. The system as claimed in claim 1,
   wherein the respective communication module has a module identification number that is unique within the system, wherein the respective communication module is configured, on reception of the identification signal, to use the data network to send a data record comprising its own module identification number, the beacon identification number transmitted with the first identification signal, the respectively ascertained signal strength and the counter reading transmitted with the identification signal.

3. The system as claimed in claim 2,
   wherein a server unit that stores the installation positions of the at least one first and at least one second lighting device as a function of the respective module identification number and configured to take the data records, each transmittable from the data network to the server unit and include the beacon identification number of the mobile beacon as a basis for ascertaining the position of the mobile beacon.

4. The system as claimed in claim 3,
   wherein the server unit is configured to ascertain the position of the mobile beacon by taking into consideration only data records whose transmitted counter reading is within a respectively prescribable range of values.

5. The system as claimed in claim 1,
   wherein the data network is configured as a Bluetooth mesh network.

6. The system as claimed in claim 1,
   wherein a gateway is configured to provide a data link to the data network.

7. The system as claimed in claim 1,
   wherein at least the first lighting device comprises an illuminant and an electronic operating unit for operating the illuminant, wherein the communication module of the first lighting device is connected to the electronic operating unit via a data interface, wherein the communication module is designed to read operating values from the electronic operating unit and/or to write them to the electronic operating unit.

8. The system as claimed in claim 7,
   wherein the electronic operating unit is configured to provide a power supply for the communication module of the first lighting device.

9. The system as claimed in claim 1,
   wherein the mobile beacon is configured to detect a proper motion and to take a detected proper motion as the basis of emitting the identification signal.

10. A method for ascertaining the position of a mobile beacon, comprising:
    setting up a data network between at least one first and at least one second lighting device by means of a wireless communication link, emitting an identification signal with a beacon identification number unique within a system by the mobile beacon,
    ascertaining a respective signal strength at which the first identification signal is received by a respective communication module of the at least one first and at least one second lighting device, and transmitting a counter reading of a timer of the mobile beacon with the first identification signal corresponding to a time of emission of the first identification signal for transmission.

11. The system as claimed in claim 1, wherein multiple communication modules of the at least one first and at least one second lighting device are configured to receive the identification signal emitted by the mobile beacon.

12. A system for ascertaining the position of a mobile beacon comprising:
at least one first and at least one second lighting device, each comprising a communication module for setting up a data network between the at least one first and at least one second lighting device by means of a wireless communication link,
the mobile beacon has a timer, wherein the mobile beacon is configured to emit an identification signal with a beacon identification number unique within the system and transmit a counter reading of the timer corresponding to a time of emission of the first identification signal,
wherein the respective communication modules of the at least one first and at least one second lighting device are configured to ascertain a respective signal strength at which the identification signal is receivable by the respective communication module,
wherein multiple communication modules of the at least one first and at least one second lighting device are configured to receive the identification signal emitted by the mobile beacon.

* * * * *

UNITED STATES PATENT AND TRADEMARK OFFICE
CERTIFICATE OF CORRECTION

PATENT NO. : 10,349,373 B2  
APPLICATION NO. : 15/775430  
DATED : July 9, 2019  
INVENTOR(S) : Henry Feil Page 1 of 1

It is certified that error appears in the above-identified patent and that said Letters Patent is hereby corrected as shown below:

In the Claims

Column 10, Line 23, Claim 3 should read:
-- "unit, and include the beacon identification number" --

Signed and Sealed this
Twenty-ninth Day of October, 2019

Andrei Iancu
*Director of the United States Patent and Trademark Office*